No. 792,913. PATENTED JUNE 20, 1905.
J. J. MULCONROY.
COUPLING DEVICE FOR RUBBER TUBING, PIPE, HOSE, &c.
APPLICATION FILED JAN. 16, 1903.

Witnesses
P. H. Nagle.
L. Houville.

Inventor
James J. Mulconroy.
By Niederstheim Fairbanks
Attorneys

No. 792,913. Patented June 20, 1905.

UNITED STATES PATENT OFFICE.

JAMES J. MULCONROY, OF PHILADELPHIA, PENNSYLVANIA.

COUPLING DEVICE FOR RUBBER TUBING, PIPE, HOSE, &c.

SPECIFICATION forming part of Letters Patent No. 792,913, dated June 20, 1905.

Application filed January 16, 1903. Serial No. 139,264.

*To all whom it may concern:*

Be it known that I, JAMES J. MULCONROY, a citizen of the United States, residing in the city and county of Philadelphia, State of Pennsylvania, have invented a new and useful Improvement in Coupling Devices for Rubber Tubing, Pipe, Hose, &c., of which the following is a specification.

My invention consists of an improvement in rubber tubing, pipe, hose, &c., and relates more especially to the construction of a joint or coupling by which two or more pieces of the same can be joined together, so as to produce a long length, although it is understood that my invention is applicable to other tubes and pipes—for instance, those used in the construction of vehicle-tires or in the making or repairing of such hose or other tubes where a flexible joint or connection is required between the two sections.

The invention further consists in the structural features hereinafter described and claimed.

Figure 1:
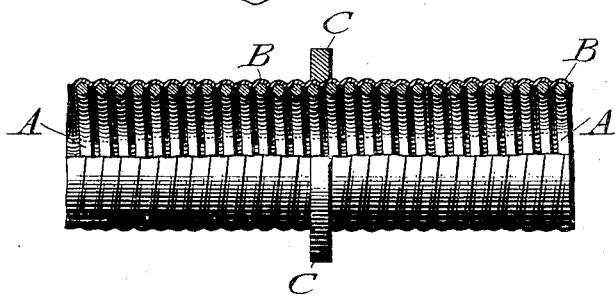
Figure 2:
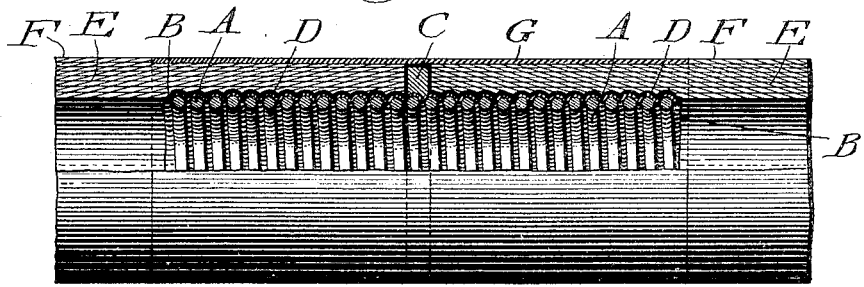

Figure 1 represents a partial side elevation and longitudinal section of a portion of a coupling for rubber tubing, pipe, hose, &c., embodying my invention. Fig. 2 represents a partial side elevation and longitudinal section of the end pieces of two sections of tubing, pipe, or hose joined in accordance with my invention.

Similar letters of reference indicate corresponding parts in the figures.

Referring to the drawings, A designates a tubular flexible supporting member, which consists conveniently of a metallic spring. This member is covered exteriorly by a ply B, which is preferably of the material forming the plies of a hose. At about the center of this tubular member A and covering B is placed a washer C, conveniently of rubber, which thus forms two annular shoulders or projections at about the center of the member A. I then cover said ply B and washer C with gum, cement, or other adhesive material, as shown at D, and then the supporting member A thus treated is inserted into the ends of the two sections of hose to be joined, as shown in Fig. 2. With the supporting member A, its covering B, and the washer C thus situated within the ends of the hose-sections the parts are vulcanized and the joint is complete and the hose-sections are durably and efficiently joined.

To add to the appearance, so as to preserve the continuity in appearance of the entire length of hose, I place a thin overlapping piece G around the ends of the hose-sections, and I preferably remove from the outside of the end portions of the hose-sections E a portion of the outer ply F and place around these inner ends and within the space formerly occupied by the sections of the outer plies F that have been removed said overlapping piece G, it being noted that by preference the diameter of the washer C and the coating D of adhesive material applied thereto is approximately the same as the diameter of the end portions of the hose after the section of the outer ply F has been removed. If this overlapping piece is applied, the vulcanizing operation takes place after such application, and the whole provides a flexible and durable joint without detracting from the appearance of the hose.

The coupling member A not only joins the sections to be coupled, but supports the same and prevents them from collapsing, which is advantageous for the following reasons: Molds are used in vulcanizing the coupling which receive the coupled portion, and this supporting member prevents the hose from collapsing from the pressure of the mold. After the coupling is complete the supporting member prevents it from being damaged, since it is obvious that if the hose could be flattened or bent to a great extent at the joint the coupling could be more easily damaged. My coupling member by supporting the hose against collapsing prevents any undesirable strain at the joint and being flexible allows the hose to bend to the desired extent, and I therefore term the same a "tubular flexible supporting coupling member."

Having thus described my invention, what I claim as new, and desire to secure by Letters Patent, is—

1. The combination with the end portions of adjacent sections of hose or tubing, of a tubular flexible supporting member secured within the same, and an annular projection upon said supporting member situated between the ends of said hose-sections and against which said ends abut.

2. The combination with the end portions of adjacent sections of hose or tubing, of a tubular flexible supporting member having an annular projection between its ends, said supporting member being inserted within the ends of said sections, with the ends of said sections abutting against said annular projection, and adhesive material situated between said tubular supporting member and its projection and the adjacent faces of the hose.

3. The combination with the end portions of adjacent sections of hose or tubing, of a tubular flexible supporting member and covering therefor, an annular projection between the ends of said tubular member, said member being inserted within the ends of said sections with the ends thereof abutting against said projection, and adhesive material situated between said covering and projection and the adjacent faces of the hose.

4. The combination with the end portions of adjacent sections of hose or tubing, of a tubular flexible supporting member situated within the ends thereof and having an annular projection between its ends, against which the ends of said sections abut, and an overlapping piece covering the ends of said hose.

5. The combination with the end portions of adjacent sections of hose or tubing, of a tubular flexible supporting member consisting of a metallic spring secured within the same and coupling said sections.

6. The combination with the end portions of adjacent sections of hose or tubing, of a flexible tubular supporting member consisting of a metallic spring secured within the same, and an annular projection upon said member situated between the ends of said hose-sections, and against which said ends abut.

JAMES J. MULCONROY.

Witnesses:
JOHN A. WIEDERSHEIM,
HARRY COBB KENNEDY.